(12) United States Patent
Hölzle et al.

(10) Patent No.: US 11,731,593 B2
(45) Date of Patent: Aug. 22, 2023

(54) LOCKING UNIT

(71) Applicant: SVM Schultz Verwaltungs-GmbH & Co. KG, Memmingen (DE)

(72) Inventors: Florian Hölzle, Illertissen (DE); Ralph Wassermann, Holzgünz (DE); Wolfgang Schütz, Memmingen (DE)

(73) Assignee: SVM Schultz Verwaltungs-GmbH & Co. KG (DE)

(*) Notice: Subject to any disclaimer, the term of this patent is extended or adjusted under 35 U.S.C. 154(b) by 173 days.

(21) Appl. No.: 17/199,910

(22) Filed: Mar. 12, 2021

(65) Prior Publication Data
US 2021/0284107 A1    Sep. 16, 2021

(30) Foreign Application Priority Data

Mar. 13, 2020  (DE) .......................... 102020107057.8

(51) Int. Cl.
*B60T 7/12* (2006.01)
*B60T 13/66* (2006.01)

(52) U.S. Cl.
CPC .............. *B60T 7/12* (2013.01); *B60T 13/662* (2013.01); *B60Y 2400/308* (2013.01)

(58) Field of Classification Search
CPC .......... B60T 7/12; B60T 13/662; B60T 1/005; B60Y 2400/308; F16D 63/006; F16H 63/416; F16H 63/3475
See application file for complete search history.

(56) References Cited

U.S. PATENT DOCUMENTS

| | | | | |
|---|---|---|---|---|
| 9,897,206 B2* | 2/2018 | Schuller | ............... | F16D 63/006 |
| 10,107,396 B2* | 10/2018 | Hofkirchner | ....... | F16H 63/3466 |
| 11,022,218 B2* | 6/2021 | Schwegler | .......... | F16H 63/3483 |
| 11,143,299 B2 | 10/2021 | Weinl | ..................... | F16H 63/38 |
| 11,193,585 B2* | 12/2021 | Mang | ................. | F16H 63/3483 |
| 2004/0011609 A1* | 1/2004 | Schmid | ............... | F16H 63/3433 188/158 |
| 2015/0008092 A1* | 1/2015 | Mang | .................. | F16H 63/3475 192/219.4 |
| 2015/0159752 A1 | 6/2015 | Popp et al. | | |

FOREIGN PATENT DOCUMENTS

DE    102018003752 A1   11/2019

OTHER PUBLICATIONS

German Patent No. DE 19908062 dated Aug. 31, 2000 to Drumm.*
Foreign Communication from European Patent Application No. 21156682.3, European Search Report, 8 pages, dated Jul. 15, 2021.

* cited by examiner

*Primary Examiner* — Pamela Rodriguez
(74) *Attorney, Agent, or Firm* — Klemchuk PLLC; Keith C. Rawlins

(57) ABSTRACT

A locking unit for the parking brake of an automatic transmission, for locking the movement of a piston which can be moved by a drive, wherein a guiding element presses catch elements radially outward and a magnetic element for sensing the position of the guiding element is connected to the guiding element. A locking device for the parking brake of an automatic transmission, wherein a piston is locked with catch elements which are guided by a guiding element which in two end positions presses different catch elements radially outwardly in each case for locking.

20 Claims, 3 Drawing Sheets

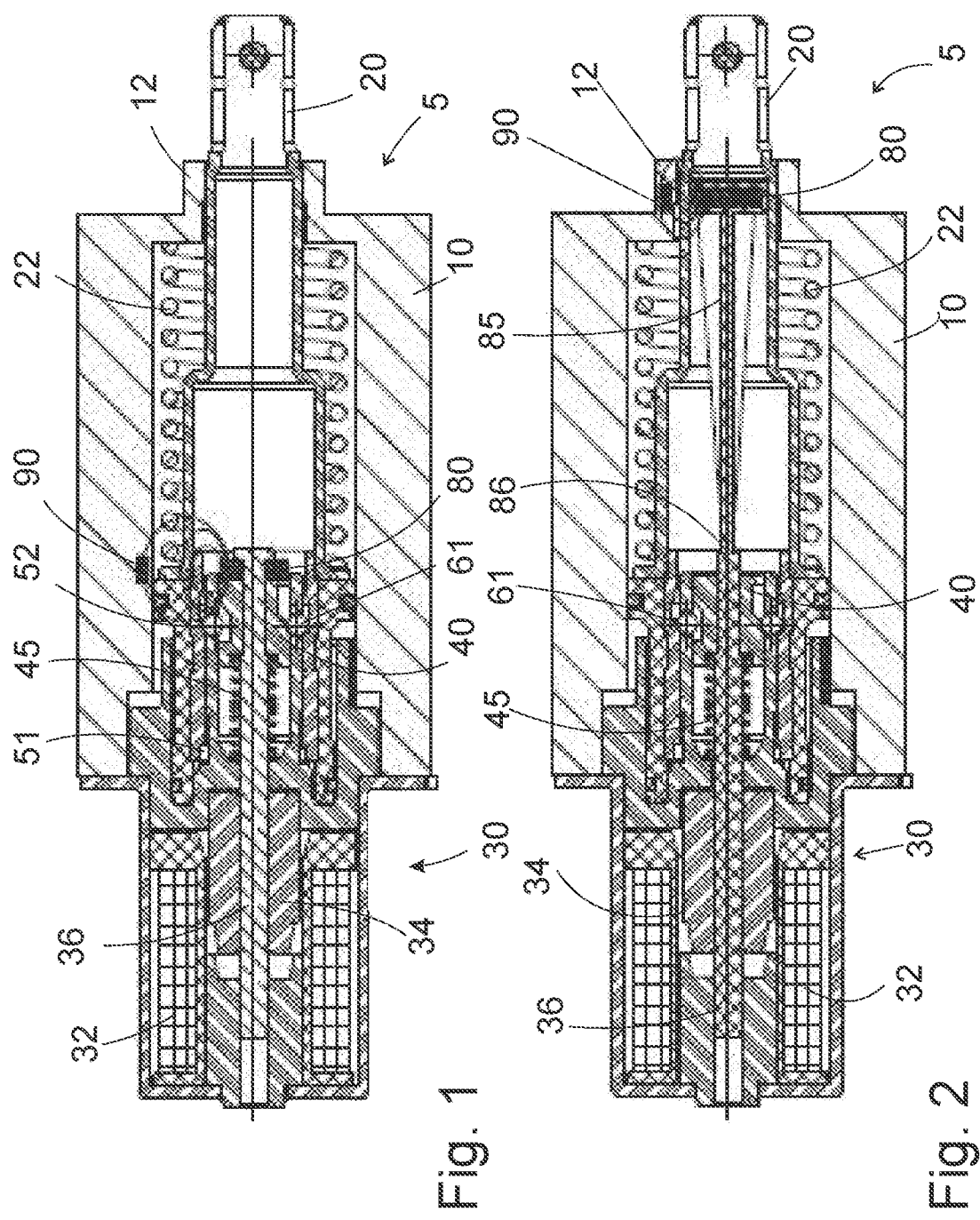

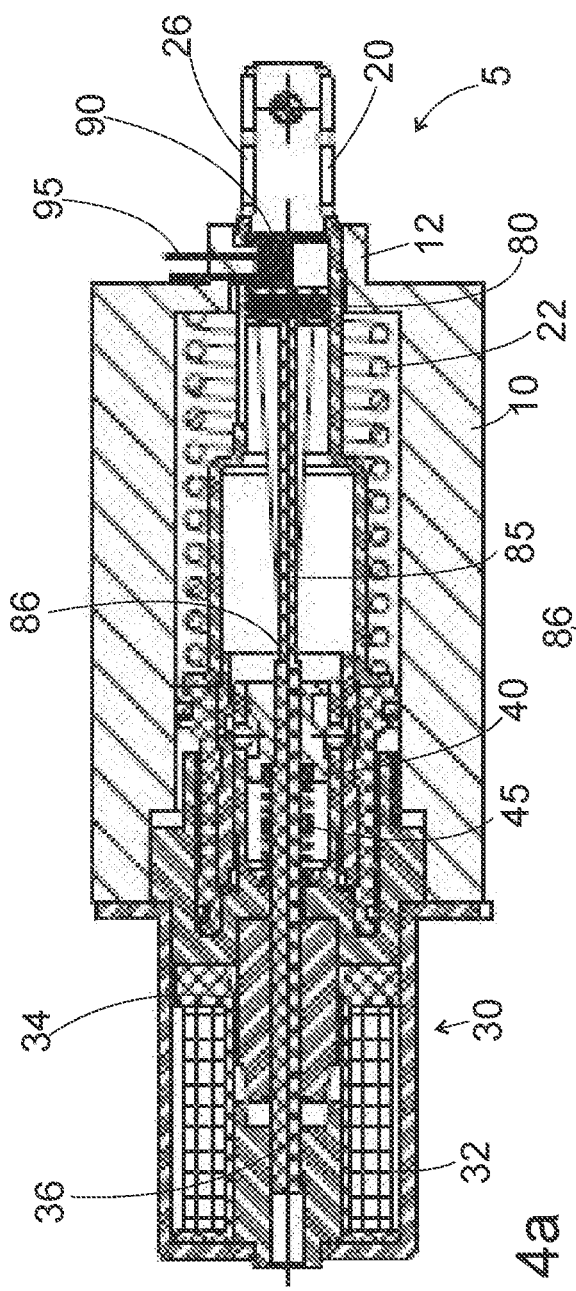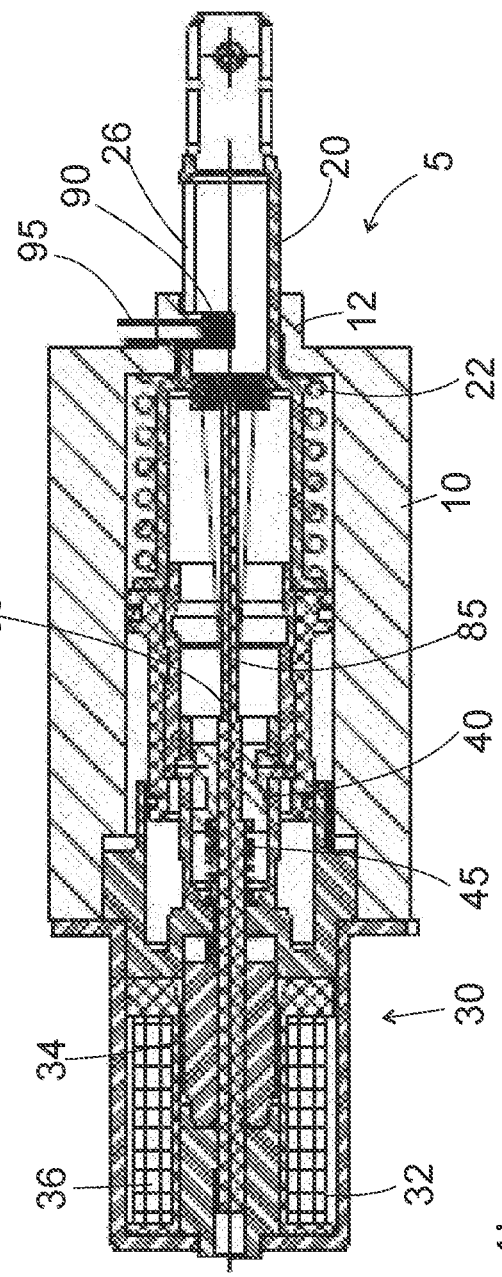
Fig. 4a
Fig. 4b

LOCKING UNIT

CROSS-REFERENCE TO RELATED APPLICATIONS

This application claims priority to German Patent Application No. 10 2020 107 057.8 filed Mar. 13, 2020, which is incorporated by reference herein in its entirety.

FIELD OF INVENTION

The disclosure relates to a locking unit for the parking brake of an automatic transmission.

BACKGROUND

Locking units are used, for example, for automatic transmissions of motor vehicles which are locked in a parked state. Such locking units are typically configured in such a manner that the parking brake depending on the switching position is in different states or is locked or is not locked. To this end, for example, a piston which can be moved in a hydraulic manner and which can be locked in an electromechanical manner can be used.

SUMMARY

Disclosed is a locking unit for the parking brake of an automatic transmission. The locking unit is used to lock the movement of a piston which can be moved by a drive and which can be acted on with pressure or hydraulic pressure. The locking unit has an electromagnet. It has at least one catch element. The piston has at least a first catch receiving member and a second catch receiving member. The piston can be secured by the retaining cooperation of a catch element with a catch receiving member.

There is connected to an armature or armature rod of the electromagnet a guiding element which presses the catch elements radially outward depending on the position.

There is provision for a magnetic element to be connected to the guiding element and for a magnetic field sensor for detecting a magnetic field of the magnetic element to be arranged in the locking unit.

Using such a locking unit, it is not only possible to lock the piston, but also in a simple manner to receive a notification as to whether a locking has also actually been carried out by the guiding element. Depending on its position, the guiding element serves to press the catch elements radially outward or not to press them radially outward. With a corresponding position of the guiding element, a locking is thereby achieved. As a result of the coupling of the magnetic element to the guiding element, the magnetic element moves in principle with the guiding element. The position thereof can be sensed by the magnetic field sensor. In particular, using a magnetic field strength, it is possible to identify how close the magnetic element is to the magnetic field sensor or whether it is potentially screened by other components.

The magnetic element may be a permanent magnet.

According to an embodiment, the magnetic element is arranged in the guiding element. For example, it may be installed inside the guiding element and, for example, be surrounded by the material of the guiding element.

The magnetic element may be arranged at an axial end of the guiding element opposite the armature. A larger spacing with respect to the electromagnet and consequently the smallest possible influence on the measurement of the magnetic field sensor is thereby achieved by a magnetic field which is produced by the electromagnet.

The magnetic element may be connected to the armature and/or to the armature rod and/or to the guiding element by a connection rod. As a result of such a connection rod, the spacing between the magnetic element and the electromagnet can be increased even further so that an even smaller influence on the measurement may be anticipated.

The magnetic element may be arranged inside the piston. It may be guided by the piston. In particular, this may be the case with the embodiment with a connection rod since in this case the connection rod can define the spacing between the magnetic element and the guiding element and consequently the spacing may be so large that the magnetic element can be arranged in a region of the piston which is spaced apart from the guiding element and which typically has a smaller diameter.

A joint can be constructed between the connection rod and the armature rod or in the connection rod. It is thereby possible to provide a degree of play which is defined by the joint so that, for example, when the magnetic element is guided in the piston, an overdeterminancy of the system occurs. Any tolerances can be compensated for in a simple manner by the joint without jamming or excessive abrasion occurring.

The piston may be constructed from a non-ferromagnetic material. This may be the case when the magnetic element is arranged in the piston and when the openings which are described in the next section are not provided. The extent of the magnetic field and consequently the measurement are in this instance not impeded or disturbed by the piston, or only to a small extent. In other cases, however, the piston may also be constructed from non-ferromagnetic material.

According to an embodiment, a first opening and a second opening are constructed in the piston, wherein the first opening is arranged radially internally with respect to the magnetic field sensor when the piston is in a first end position, and wherein the second opening is arranged radially internally with respect to the magnetic field sensor when the piston is in a second end position. It is thereby possible for the magnetic field which is produced by the magnetic element to be able to readily pass through the opening when the magnetic element, the corresponding opening and the magnetic field sensor are located axially at the same location. In other words, this may be the case when the magnetic element is located radially internally with respect to an opening and the opening is in turn located radially internally with respect to the magnetic field sensor. If the magnetic element is axially spaced apart from the opening, however, the magnetic field may be screened by the piston and consequently a greater difference in the magnetic field sensed by the magnetic field sensor between different positions may be produced.

The piston may be constructed from a ferromagnetic material. This may be particularly advantageous in connection with the above-mentioned embodiment with openings since the magnetic field is screened when the magnetic element is located axially spaced apart from the openings. Consequently, as already mentioned, the difference in the detected magnetic field can be increased. However, the piston may also be constructed to be ferromagnetic in other embodiments, or in the embodiment with holes a non-ferromagnetic piston may be used.

The magnetic field sensor may be arranged radially externally with respect to the magnetic element when the guiding element is in an end position. In some embodiments, the magnetic field sensor may be arranged radially externally with respect to the magnetic element when the guiding element is in the end position with maximum spacing with respect to the electromagnet. The spacing between the magnetic field sensor and the electromagnet can thereby be increased so that disruptive influences are minimized. In particular, the magnetic field sensor may be arranged in a housing of the locking unit which receives the piston. The magnetic field sensor may in this instance be arranged, for example, axially in the region of the guiding element, but typically radially further outward. The magnetic field sensor may also be arranged in a flange of the housing. This may particularly be the case with embodiments which use a connection rod.

According to an embodiment, the magnetic field sensor may be arranged in the piston. It is thereby possible for a magnetic field of a magnetic element which is moved or guided in the piston to be detected. In this embodiment, the magnetic field sensor may be secured to a housing of the locking unit by a retention member, wherein in this instance an axially extending recess may be provided in the piston so that the retention member can pass through.

The magnetic field sensor may be a Hall sensor. This has been found to be advantageous for typical embodiments. However, other embodiments can also be used.

The locking unit may have an evaluation unit which is coupled to the magnetic field sensor and which is configured, based on initial values of the magnetic field sensor, to establish a position of the guiding element. Consequently, it is possible to verify whether a locking has also actually been successful, wherein, for example, it can be verified whether a sensed magnetic field is located above or below a threshold value in terms of value. The use of direction-sensitive data of a magnetic field is also possible.

The locking unit may have a pretensioning spring which pretensions the guiding element into an end position. This is typically the end position which the guiding element assumes when the electromagnet is not supplied with electric power.

BRIEF DESCRIPTION OF THE DRAWINGS

The invention will now be described with reference to the appended figures, in which:
FIG. 1 illustrates a cross-sectional view of a locking unit according to a first embodiment,
FIG. 2 illustrates a cross-sectional view of a locking unit according to a second embodiment,
FIGS. 4a and 4b illustrate cross-sectional views of a locking unit according to a fourth embodiment.

DETAILED DESCRIPTION

Figure 3A:
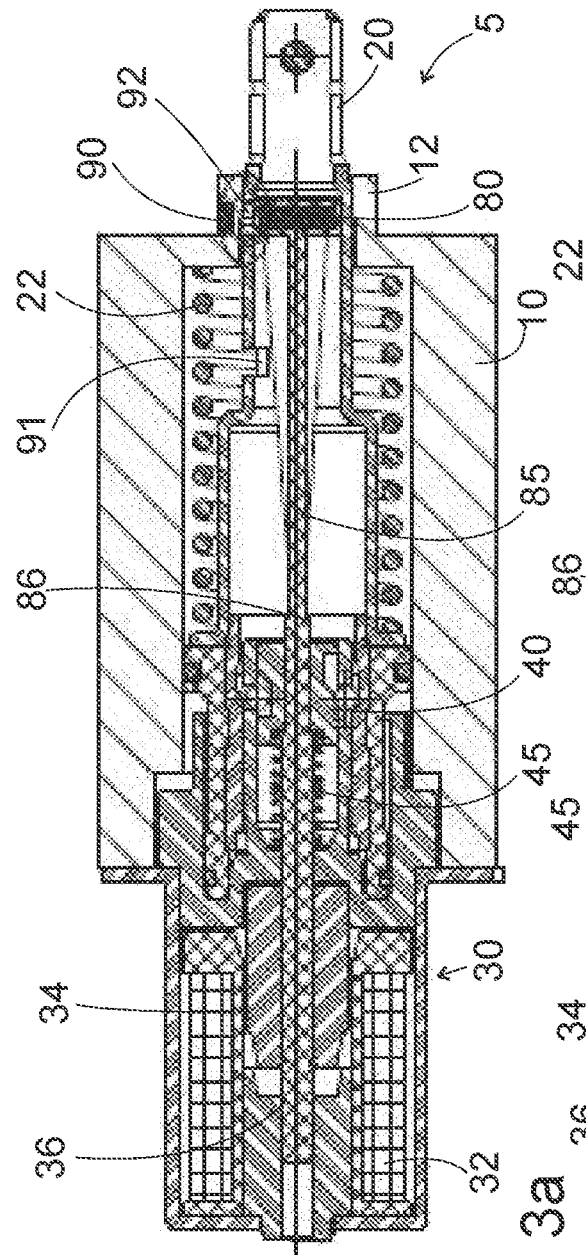
FIGS. 3a and 3b illustrate cross-sectional views of a locking unit according to a third embodiment.

FIG. 1 shows a locking unit 5 according to a first embodiment. The locking unit 5 has a housing 10 on which a flange 12 is constructed at the right-hand side. In the housing 10, there is guided a piston 20 which protrudes partially from the housing 10, on the flange 12. It can be used to lock a parking brake of an automatic transmission. The piston 20 is pressed to the left by a piston spring 22 which is arranged in the housing 10 and can be pressed hydraulically to the right in a manner not illustrated in greater detail. A first catch receiving member 51 and a second catch receiving member 52 are constructed in the piston 20. These members serve to receive catch elements 61, which can be pressed into the catch receiving members 51, 52.

For locking, an electromagnet 30 is first provided at the left side on the locking unit 5. The electromagnet 30 has a coil 32 which can produce a magnetic field when current flows through. The electromagnet 30 has an armature 34 which is connected to an armature rod 36. The armature rod 36 is connected at the right-hand side to a guiding element 40. The guiding element 40 is pressed by a pretensioning spring 45 to the right into an end position. It can consequently remain in this end position when no electric power is supplied to the electromagnet 30 and is pulled to the left when the electromagnet 30 is supplied with electric power. Depending on the position thereof, the guiding element 40 presses the catch elements 61 outward or not.

At the right-hand side on the guiding element 40, a magnetic element 80 in the form of a permanent magnet is fitted. This magnet produces a magnetic field which expands radially outward.

In the state illustrated in FIG. 1, the guiding element 40 is in the right-side end position thereof, in which it is spaced apart to the greatest extent from the electromagnet 30, A magnetic field sensor 90 in the form of a Hall sensor is arranged directly radially outside the magnetic element 80 which is located in this end position. This leads to the magnetic field lines passing through the magnetic element 90 as shown and the spacing in this state between the magnetic element 80 and magnetic field sensor 90 being the smallest. If electric power is supplied to the electromagnet 30, the guiding element 40 is pulled to the left by the armature 34 and the spacing between the magnetic element 80 and magnetic field sensor 90 increases. This is detected by the magnetic field sensor 90 so that based on the detected magnetic field conclusions can be drawn relating to the position of the magnetic element 80 and consequently also the position of the guiding element 40 which is securely connected thereto. If the guiding element 40 is located in the end position illustrated in FIG. 1, a locking is brought about since the catch elements 61 are pressed outward. A corresponding magnetic field can be detected in a simple manner and it can, for example, be determined that it exceeds a predetermined threshold value. This enables simple verification of a reliable locking.

FIG. 2 shows a locking unit 5 according to a second embodiment. In this instance, in contrast to the embodiment of FIG. 1, the magnetic element 80 is not secured directly to the guiding element 40, but instead spaced further apart therefrom to the right via a connection rod 85. In this embodiment, the magnetic element 80 is guided in the piston 20 and carried thereby. There is arranged between the armature rod 36 and guiding rod 85 a joint 86, by which the guiding rod 85 can be changed in terms of its angle relative to the armature rod 36. An overdeterminancy of the system is thereby prevented, and a jamming or increased abrasion is consequently prevented.

The associated magnetic field sensor 90 is arranged radially outside in the flange 12 of the housing 10. When the magnetic element 80 is located furthest to the right, that is to say, in an end position which corresponds to that of FIG. 1, the magnetic element 80 is located radially inside the magnetic field sensor 90. In this instance, the spacing is thereby the shortest, wherein this spacing is increased, when the magnetic element 80 is pulled to the left together with the guiding element 40. This can be detected by the magnetic field sensor 90. The piston 20 is in this instance made of a non-ferromagnetic material in order not to disturb the propagation of the magnetic field lines.

Figure 3B:
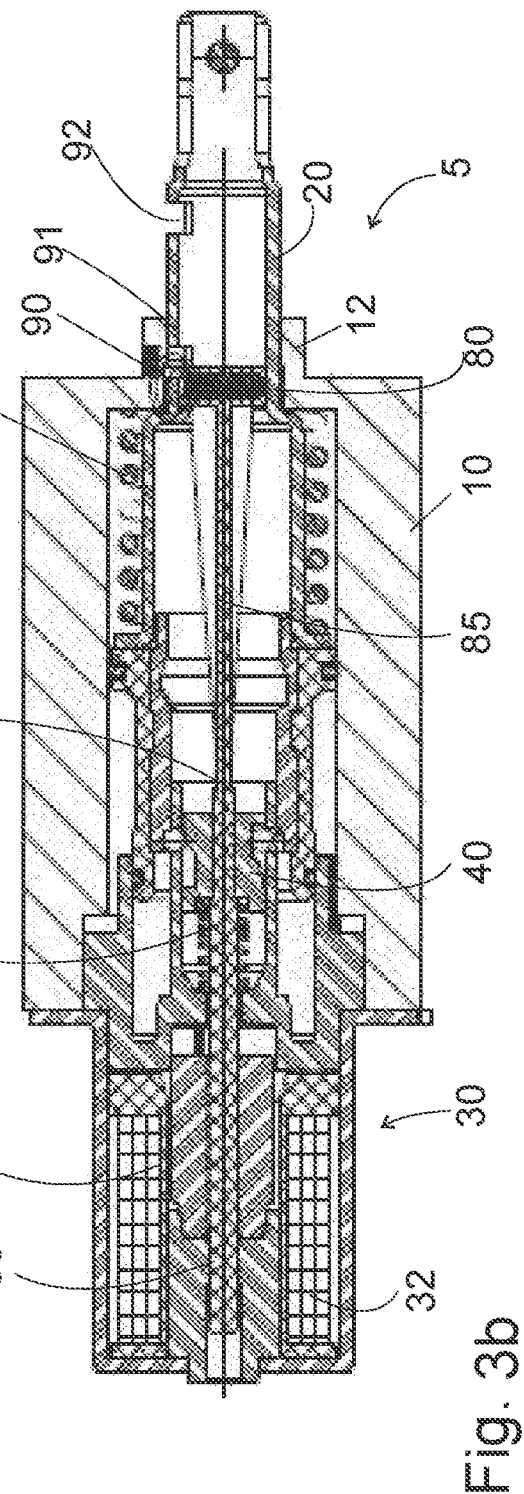

FIGS. 3a and 3b show a locking unit 5 according to a third embodiment. In contrast to the embodiment of FIG. 2, in this instance the piston 20 is constructed from a ferromagnetic material. Furthermore, a first opening 91 and a second opening 92 are constructed in the piston 20. FIG. 3a shows a state in which the piston 20 assumes the left-side end position and the magnetic element 80 assumes the right-side end position thereof. FIG. 3b shows a position in which the piston 20 assumes the right-side end position and the magnetic element 80 assumes the left-side end position thereof. As shown, in the state of FIG. 3a the second opening 92 is arranged radially inside the magnetic field sensor 90. The magnetic element 80 is also arranged precisely radially inside the magnetic field sensor 90. In the state of FIG. 3, however, the first opening 91 is arranged precisely radially inside the magnetic field sensor 90. The magnetic element 80 is, however, arranged axially spaced apart therefrom.

In the state of FIG. 3a, the second opening 92 enables a direct propagation of the magnetic field lines through the second opening 92 toward the magnetic field sensor 90. The magnetic field is thereby particularly powerful in this state. If the magnetic element 80 is moved to the left, however, the magnetic field lines are deflected by the ferromagnetic piston 20 and no longer reach or still only reach the magnetic field sensor 90 in a very weak state. The effect would be equivalent if the piston 20, in contrast to the state illustrated in FIG. 3b, were located in the left-side end position thereof. As a result of the described embodiment with the two openings 91, 92, and also with the ferromagnetic piston, a particularly high difference between the sensed magnetic field in the two end positions of the magnetic element 80 and consequently also the guiding element 40 can be achieved.

FIGS. 4a and 4b show a locking unit 5 according to a fourth embodiment. With regard to the states shown and the respective positions of the piston 20 and the magnetic element 80, reference may be made to the description of FIGS. 3a and 3b.

In contrast to the embodiment of FIGS. 3a and 3b, the magnetic field sensor 90 is not arranged in the housing 10, but instead is located in the piston 20. To this end, on the upper side of the piston 20 there is arranged an axially extending recess 26 through which a retention member 95 for the magnetic field 90 extends. This is secured to the housing 10 and carries the magnetic field sensor 90. On the basis of a change of the magnetic field, it is thereby possible for a spacing between the magnetic element 80 and the magnetic field sensor 90 to be sensed directly without the magnetic field having to pass through other components.

The invention is not limited to one of the above-described embodiments, but instead can be modified in varied ways.

All of the features and advantages derived from the claims, the description and the drawings, including structural details, spatial arrangements and method steps, may be inventively significant both alone and in extremely varied combinations.

LIST OF REFERENCE SIGNS

5: Locking unit
10: Housing
12: Flange
20: Piston
22: Piston spring
26: Recess
30: Electromagnet
32: Coil
34: Armature
36: Armature rod
40: Guiding element
45: Pretensioning spring
51: Catch receiving member
52: Catch receiving member
61: Catch element
80: Magnetic element
85: Guiding rod
86: Joint
90: Magnetic field sensor
91: Opening
92: Opening
95: Retention member

What is claimed is:

1. A locking unit, for a parking brake of an automatic transmission, for locking a movement of a piston which can be moved by a drive and which can be acted on with pressure or hydraulic pressure,
wherein the locking unit has an electromagnet and at least one catch element, the piston has at least a first catch receiving member and a second catch receiving member and the piston can be secured by a retaining cooperation of the at least one catch element with one of the catch receiving member,
wherein there is connected to an armature or an armature rod of the electromagnet a guiding element which presses the at least one catch element radially outward depending on a position of the guiding element,
wherein a magnetic element is connected to the guiding element, and
a magnetic field sensor for detecting a magnetic field of the magnetic element is arranged in the locking unit.

2. The locking unit as claimed in claim 1, wherein the magnetic element is arranged in the guiding element.

3. The locking unit as claimed in claim 1, wherein the magnetic element is arranged at an axial end of the guiding element opposite the armature.

4. The locking unit as claimed in claim 1, wherein the magnetic element is connected to the armature, to the armature rod, or to the guiding element by a connection rod.

5. The locking unit as claimed in claim 1, wherein the magnetic element is connected to the armature, to the armature rod, and to the guiding element by a connection rod.

6. The locking unit as claimed in claim 5, wherein the magnetic element is arranged inside the piston or is guided by the piston.

7. The locking unit as claimed in claim 5, wherein the magnetic element is arranged inside the piston and is guided by the piston.

8. The locking unit as claimed in claim 5, wherein a joint is constructed between the connection rod and the armature rod.

9. The locking unit as claimed in claim 5, wherein a joint is constructed in the connection rod.

10. The locking unit as claimed in claim 5, wherein the piston is constructed from a non-ferromagnetic material.

11. The locking unit as claimed in claim 5, wherein a first opening and a second opening are constructed in the piston.

12. The locking unit as claimed in claim 11, wherein the first opening is arranged radially internally with respect to the magnetic field sensor when the piston is in a first end position and wherein the second opening is arranged radially internally with respect to the magnetic field sensor when the piston is in a second end position.

13. The locking unit as claimed in claim 12, wherein the piston is constructed from a ferromagnetic material.

14. The locking unit as claimed in claim 1, wherein the magnetic field sensor is arranged radially externally with respect to the magnetic element when the guiding element is in an end position.

15. The locking unit as claimed in claim 1, wherein the magnetic field sensor is arranged radially externally with respect to the magnetic element when the guiding element is in an end position with maximum spacing with respect to the electromagnet.

16. The locking unit as claimed in claim 1, wherein the magnetic field sensor is arranged in a housing of the locking unit which receives the piston.

17. The locking unit as claimed in claim 16, wherein the magnetic field sensor is arranged in a flange of the housing.

18. The locking unit as claimed in claim 1, wherein the magnetic field sensor is arranged in the piston or wherein the magnetic field sensor is secured by a retention member to a housing of the locking unit.

19. The locking unit as claimed in claim 1, wherein the magnetic field sensor is arranged in the piston and wherein the magnetic field sensor is secured by a retention member to a housing of the locking unit.

20. The locking unit as claimed in claim 1, wherein the locking unit has an evaluation unit which is coupled to the magnetic field sensor and which is configured, based on initial values of the magnetic field sensor, to establish a position of the guiding element.

\* \* \* \* \*